(12) United States Patent
Zhang et al.

(10) Patent No.: US 7,334,179 B2
(45) Date of Patent: Feb. 19, 2008

(54) METHOD AND SYSTEM FOR DETECTING AND CORRECTING ERRORS WHILE ACCESSING MEMORY DEVICES IN MICROPROCESSOR SYSTEMS

(75) Inventors: Yan Zhang, Cupertino, CA (US); Paul Yang Lu, Los Altos, CA (US); Yue Chen, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 598 days.

(21) Appl. No.: 10/919,138

(22) Filed: Aug. 16, 2004

(65) Prior Publication Data

US 2005/0283650 A1 Dec. 22, 2005

Related U.S. Application Data

(60) Provisional application No. 60/577,007, filed on Jun. 4, 2004.

(51) Int. Cl.
G11C 29/42 (2006.01)
(52) U.S. Cl. .................. 714/764; 714/763; 714/773
(58) Field of Classification Search ........ 714/763–764, 714/773; G11C 29/42
See application file for complete search history.

(56) References Cited

U.S. PATENT DOCUMENTS

2003/0046631 A1* 3/2003 Gappisch et al. ........... 714/763
2004/0153902 A1* 8/2004 Machado et al. ........... 714/710
2004/0237022 A1* 11/2004 Karpuszka et al. ......... 714/764

OTHER PUBLICATIONS

Modules; UK National HPC Service; Aug. 17, 2004; URL: http://web.archive.org/web/20040910063035/http://www.csar.cfs.ac.uk/user_information/software/modules.shtml.*
Module (programming); Wikipedia, the free encyclopedia; Dec. 24, 2004; URL: http://web.archive.org/web/20050127185423/http://en.wikipedia.org/wiki/Module_(programming).*

* cited by examiner

*Primary Examiner*—R. Stephen Dildine
(74) *Attorney, Agent, or Firm*—McAndrews, Held & Malloy, Ltd.

(57) ABSTRACT

A method and system for ensuring data integrity in a data processing system may comprise monitoring when data for a specified device is available for error correction code generation, and receiving a first indication of the specified device, a second indication of the data, and a third indication of a size of the data during the monitoring. A new error correction code may be generated in hardware for the data based on the indicated size of the data and an indication may be provided to signal when generation of the new error correction code for a specified number of accesses for at least a portion of the data is complete. Detected errors may be corrected in software based on the newly generated error correction code. The first indication may be a device selection signal and the error correction code generation may be enabled or disabled via an enable signal.

79 Claims, 4 Drawing Sheets

METHOD AND SYSTEM FOR DETECTING AND CORRECTING ERRORS WHILE ACCESSING MEMORY DEVICES IN MICROPROCESSOR SYSTEMS

CROSS-REFERENCE TO RELATED APPLICATIONS/INCORPORATION BY REFERENCE

This application makes reference to, claims priority to and claims the benefit of U.S. Provisional Application No. 60/577,007.

The above referenced application is hereby incorporated herein by reference in its entirety.

FIELD OF THE INVENTION

Certain embodiments of the invention relate to processing of digitized information. More specifically, certain embodiments of the invention relate to a method and system for detecting and correcting errors while accessing memory devices in microprocessor systems.

BACKGROUND OF THE INVENTION

A flash device is essentially an electrically erasable programmable read only memory (EEPROM or $E^2$PROM), which allow blocks of data to be programmed or erased at relatively high operating speeds. A flash differs from an EEPROM in that a flash is generally adapted to operate on blocks of data while an EEPROM or $E^2$PROM has to be erased all at once, even though the EEPROM may be programmed on a byte-by-byte basis.

Today, NAND flash and NOR flash memory devices dominate the non-volatile flash memory market. A NAND flash memory is a non-linear addressed device requiring multiplexed input/output (I/O) pins for handling both data and commands. A NAND flash memory device is a serially interfaced device in which address, data, and control information are multiplexed on the same pins. As a result of its serial interface, the NAND flash memory device requires extensive I/O interfaces and drivers for handling the multiplexed I/O pins. A NAND flash memory device is typically accessed by block or page, thereby permitting, for example, 512 bytes of data to be written to or read from the device. Random access errors generated by physical degradation in the geometry of the NAND gates results in low reliability for NAND flash memory devices.

A NOR flash device is a linear addressed device, which comprises separate address and data lines. In this regard, a NOR flash device is somewhat similar to a dynamic random access memory (DRAM) device. A NOR flash memory generally comprises sufficient address pins that allow it to be memory mapped into a processor's address space, thereby allowing the NOR flash to be accessed like a read only memory (ROM). The cell structure of NAND flash is almost one-half the size of a NOR flash's cell structure and as a result, for a given die, NAND flash memory devices have a much higher packing density than NOR flash memory devices. For example, NOR flash capacities range from 1 megabyte (MB) to 4 MBs while NAND flash capacities range from 32 MBs to 512 MBs. In addition to its higher packing density and thus higher capacity, NAND flash is cheaper than NOR flash since it utilizes much smaller die size of silicon wafer than NOR flash. NOR flash memory devices also possess less than 10% of the lifespan of NAND flash memory devices.

Given today's trends in wireless communication technologies, consumer demand is constantly forcing device manufactures to create access devices such as handhelds, which store more data using less chip die size at significantly lower costs. A NAND flash memory is typically utilized in portable electronic devices/products that require a large storage capacity, which can store data when there is a loss of power. NAND flash memory is also utilized in these products/devices because of its low cost and low power consumption when compared with traditional NOR flash memory. Today, NAND flash is widely utilized in USB storage devices, MP3 players, digital answer machines, digital recorders, various kinds of memory cards including, but not limited to, compact flash cards, SmartMedia cards, and SecureDigital (SD) cards. In cellular telephones (cell phones) and personal digital assistant (PDA) type devices, for example, NAND flash may be utilized to store digitized data such as images, audio and video.

Although NAND flash possesses the highest bit densities of the various types of flash memories, is inexpensive, and has much lower power consumption than NOR flash, it has a low reliability due to runtime bad bit and prolonged access time. Unlike NOR flash, these issues of reliability with NAND flash makes it impractical to execute the computer instructions directly from the NAND flash. Notwithstanding, manufactures of NAND flash recommend the use of error correcting technology to enhance data integrity. After using error correction technology, the bad bits can be detected and corrected, thereby making the NAND flash a more practical solution for storing computer instruction and for storing data like on a hard disk, which may be managed by a file system in order to maintain data integrity.

In existing systems, error correction methodologies typically operate on a page of data of the order of 512, 1024, 2048 bytes or larger page size. Furthermore, special logic operations such as bit manipulations are required to generate the error correction codes. Accordingly, if only software is utilized to compute and/or otherwise generate the error correction codes, then a large amount of processor cycles are required because utilizing a processor for bit manipulations may be ineffective. On the other hand, if only hardware is utilized to compute the error correction codes, then additional storage is required to store the pages of data. As the page size increases, so does the amount of memory that is required for storing the page data. For embedded system applications, for example, the additional storage may be very expensive since a large gate count is required and this makes the chip very expensive.

Existing standalone chips require a large die size because the standalone chips utilizes sufficiently large storage for storing pages of data that is controlled by a programmable state machine, which is adapted to generate the error correction codes. Furthermore, processors do not provide the most optimal manner for handling bit manipulations. In instances where only software is utilized to generate error correction codes, and detect and correct errors, the software utilizes a huge amount of processing time that may block other software applications from running.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for ensuring data integrity in a data processing system. Aspects of the method may comprise monitoring when the data for a specified device is available for error correction code generation, and receiving a first indication of the specified device, a second indication of the data, and a third indication of a size of the data during the monitoring. A new error correction code may be generated in hardware for the data based on the indicated size of the data and an indication may be provided to signal when generation of the new error correction code for a specified number of accesses for at least a portion of the data is complete. Detected errors may be corrected in software based on the newly generated error correction code.

The first indication may be a device selection signal and the error correction code generation may be enabled or disabled via an enable signal. The second indication may be a data ready signal and the third indication may be a data size signal, which indicates a size of the data. The method may also comprise counting a specified number of accesses, which may be controlled by a page size setting. A page counter may be specified, which indicates bytes of data that are processed. The method may also comprise generating an interrupt when the page counter indicates that all the bytes have been processed. A signal may be generated that indicates when generation of the new error correction code is complete It may be determined whether data access for the data is a read access or a write access. Error correction code generation for the data may be deactivated and it may be determined whether the data access is a read operation or a write operation. If the data access is a write operation, then the newly generated error correction code may be written to external memory. If the data access is a read operation, then a newly generated error correction code may be read and a stored error correction code corresponding to the read data may be read or otherwise acquired.

The integrity of the read data may be checked and the newly generated error correction code may be compared with a stored error correction code corresponding to the read data. It may then be determined whether the newly generated error correction code matches the stored error correction code. If the newly generated error correction code does not match the stored error correction code, then it may be determined whether the error correction code is incorrect. It may further be determined whether an error is correctable if the error correction code is not in error. If the error is correctable, the error may be corrected. In instances where the error is not correctable, the processor may report the error, for example, to an upper layer application.

In another embodiment of the invention, a method for ensuring data integrity in a data processing system may comprise generating error correction codes for data utilizing a hardware on-chip error correction code module and detecting bytes in error and bits in error via code executed by a processor. The detected bytes in error and bits in error may be corrected utilizing the code executed by the processor. The method may further comprise generating a signal by the hardware on-chip error correction code module, which indicates completion of the generation of the error correction code. The processor may be notified when generation of the error correction code is complete.

Another embodiment of the invention may provide a machine-readable storage, having stored thereon, a computer program having at least one code section executable by a machine, thereby causing the machine to perform the steps as described in the various embodiments above for ensuring data integrity in a data processing system.

Aspects of the system may comprise an error correction code module that monitors when the data for a specified device is available for error correction code generation and receives a first indication of the specified device, a second indication of the data, and a third indication of a size of the data during the monitoring. The error correction code module may generate a new error correction code in hardware for the data based on the indicated size of the data. An indication may be provided to signal when generation of the new error correction code for a specified number of accesses for at least a portion of the data is complete. Code executed by a processor may correct detected errors in software based on the newly generated error correction code.

The first indication may be a device selection signal and an enable signal may be utilized to enable or disable generation of the error correction code. In this regard, the data enable signal may enable generation of the error correction code when it is asserted and disable generation of the error correction code when it is de-asserted. The second indication may be a data ready signal and the third indication may be a data size signal, which indicates a size of the data. A page size setting may be utilized to count and control a specified number of accesses. Furthermore, a page counter may be specified, which indicate bytes of data that are processed. An interrupt may be generated and sent to the processor to inform error detection and correction (EDC) code when the page counter indicates that all the bytes have been processed. A signal may be generated that indicates when generation of the new error correction code is complete.

The processor may be adapted to determine whether data access for the data is a read access or a write access. The processor may deactivate error correction code generation and determine whether the data access is a read operation or a write operation. If the data access is a write operation, then the newly generated error correction code may be written to external memory by the processor. If the data access is a read operation, then a newly generated error correction code may be read and a stored error correction code corresponding to the read data may be read or otherwise acquired by the processor.

The code executed by the processor may be configured to check or verify the integrity of the read data and the newly generated error correction code may be compared with a stored error correction code corresponding to the read data. The code executed by the processor may then determine whether the newly generated error correction code matches the stored error correction code and whether the error correction code is incorrect if the newly generated error correction code does not match the stored error correction code. The code executed by the processor may then determine whether a detectable error is correctable if the error correction code is not in error. If the error is correctable, the code executed by the processor may correct the error. In instances where the error is not correctable, code executed by the processor may be adapted to report the error, for example, to an upper layer application.

Another embodiment of the system for ensuring data integrity in a data processing system comprises an on-chip hardware error correction code module that generates error correction codes. A processor may detect bytes in error and bits in error via code executed by the processor and the processor may correct the detected bytes in error and bits in error utilizing the code executed by the processor. The on-chip hardware error correction code module may generate a signal that indicates completion of the generation of the error correction code. The on-chip hardware error correction code module may also be adapted to notify the processor when generation of the error correction code is complete.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for detecting and correcting errors while accessing memory devices in microprocessor systems. An on-chip hardware error correction code module may be utilized to generate error correction codes. By storing and regenerating the error correction codes, software or other type of computer code may be utilized to detect bytes in error and/or bits in error, and the detected errors may be corrected utilizing the code, which may be executed by a processor. The on-chip hardware error correction code module may generate a signal that indicates completion of the generation of the error correction code. The on-chip hardware error correction code module may also be adapted to notify the software or other type of error correction code when generation of the error correction code is complete. The software may read the re-generated error correction code and compare it with a stored error correction code in order to detect if any data byte or bit error exists and if so, correct the error.

The various aspects and embodiments of the invention may be found in a method and system that provides an optimal balance between hardware processing and software processing operations that are utilized to generate the error correction codes, and to detect and correct any detected error. This optimal balance between hardware and software operations utilizes significantly less processor cycles and the gate count and consequently the die size is significantly less than other existing systems that are utilized for generating error correction codes, and for detecting and correcting errors. For example, this optimal balance between hardware and software, which utilizes hardware to generate the error correction codes, and software to detect and correct errors, may result in chip implementations that are about $\frac{1}{10}^{th}$ the size of existing similar systems that are implemented by a standalone chip.

Figure 1:
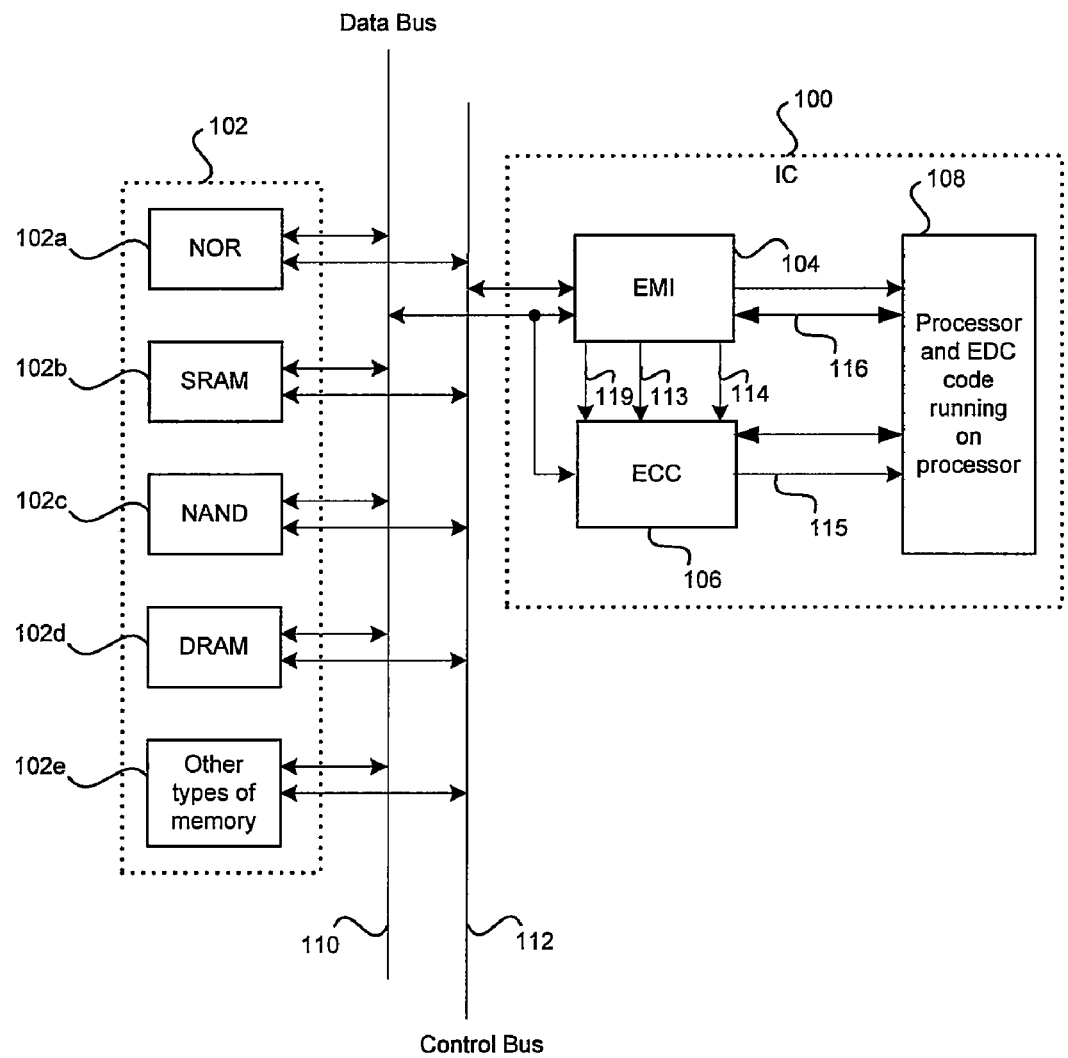
FIG. 1 is a block diagram of an exemplary system that may be utilized for generating error correction codes, in accordance with an embodiment of the invention.

FIG. 1 is a block diagram of an exemplary system that may be utilized for generating error correction codes in accordance with an embodiment of the invention. Referring to FIG. 1, there is shown a unified memory block 102, an external memory interface (EMI) 104, an error correction code (ECC) module or circuitry 106, and a "processor with error detection and correction (EDC) code running on it" block 108. The "processor with error detection and correction (EDC) code running on it" block 108 may be referred to as the processor/EDC code 108.

The unified memory block 102 may comprise a plurality of memory blocks, for example, NOR memory block 102a, SRAM block 102b, and NAND flash memory block 102c, DRAM 102d, and "other types of memory" block 102e. The external memory interface (EMI) 104, error correction code module 106, and the processor 108 may be integrated into a single integrated circuit (IC) chip or module. Accordingly, the NOR memory block 102a, SRAM block 102b, NAND flash memory block 102c, DRAM block 102d and "other types of memory" block 102e may be located external to the single integrated circuit module. In another aspect of the invention, the memory block 102, which may comprise NOR flash 102a, SRAM 102b, NAND flash 102c, DRAM 102d, and "other types of memory" 102e such as SDRAM or DDR, may be integrated into a chip or module within the external memory interface module 104, the hardware ECC module 106 and/or processor/EDC code 108.

The external memory interface module 104 may comprise suitable logic circuitry and/or code that may be adapted to interface with the external memory modules within the unified memory block 102, the error correction code module 106 and the processor/EDC code 108. In accordance with an aspect of the invention, the error detection and correction code may be adapted to instruct the EMI module 104, through the internal bus 116, to do read and/or write accesses to the modules within the unified memory block 102 via the address and control status bus 112 and the data bus 110. Whenever these reads or writes are executed, the external memory interface module 104 may generate one or more signals, which informs the error correction code module 106 of the corresponding data presets on the data bus and/or the data size.

The EMI module 104 may be a simple memory controller or a complex memory controller. In one aspect of the invention, a complex memory controller may combine a memory controller with a direct memory access (DMA) controller module. The DMA controller module may initiate memory accesses like a processor does, whenever it is instructed to do so by software or other code. In the case of a complex memory controller, the interface between the memory controller and the DMA controller module may be an internal bus of module 100, for example, bus 116. The internal bus may be utilized to transfer instructions to the DMA controller module.

The error correction code module 106 comprises suitable logic or circuitry that may be adapted to generate appropriate error correction code. The EDC code may be adapted to instruct the error correction code module 106 via internal bus 116 to compute error correction code, set page size and compute ECC algorithms. The error correction code module 106 may be adapted to constantly monitor data status signal 113 and data size signal 114 and update error correction codes when the external memory interface 104 is accessing the target device such as any of the memories in the memory block 102.

Based on control information placed on the external memory address, control status bus 112 and/or data bus 110, for example, the external memory interface module 104 may be configured to determine which memory block within the unified memory block 102 is being accessed. Accordingly, the external memory interface 104 is adapted to generate a data status signal 113 instructing the error correction code module 106 that valid data is presently on the data bus 110. Since the data bus 110 may be several bytes wide, the byte size signal 114 may be utilized to inform the error correction code module 106 of the size of the data in bytes that is presently on the data bus 110. The data ready signal 113 may be utilized to signify the number of bytes of data that is presently on the bus for which error correction code should be computed. For example, the data size signal 114 my indicate that the data bus width 110 is two bytes wide and the hardware ECC module 106 may be adapted to compute the error correction code for the two bytes of data that are presently on the data bus 110.

The unified memory block 102 permits data to be read from or written to any of the memory blocks 102a, 102b, 102c, 102d, or 102e. For example, in a first cycle, software running on processor 108 may read data from NOR memory 102a, and in a second subsequent cycle, software may write data to SRAM 102b. Furthermore, in a third subsequent cycle, data may be read from or written to NAND flash memory 102c. Using one or more signals, software may be adapted to instruct the external memory interface 104 to access the unified memory block 102a, 102b, 102c, 102d and/or 102e.

The unified memory may be accessed in a burst page mode, which means that it is continuously read or written on a per page basis, where each page contains a fixed amount of data, for example, 256, 512, 1024, bytes. When the external memory interface 104 begins page access to any one of the memory blocks 102a, 102b, 102c, 102d and 102e, the EDC code running on processor 108 will signal the external memory interface module 104, which will then signal the error correction code module 106 of the data access. Whenever the memory access occurs, the external memory interface module 104 will signal the error correction code module 106 via signals 113, 114 and 119 to initiate computation of the error code for the specified data that is presently on the bus 110.

In accordance with an embodiment of the invention, it may not be necessary to compute error correction codes for every type of memory, but only for a particular type of memory. For example, it may not be necessary to compute error correction codes for the DRAM block 102d but it may be necessary to compute error correction code for NAND flash 102c. Signal 119 may be utilized to indicate the type of memory that is being accessed. In this regard, signal 119 may be utilized by the error correction code module 106 to indicate when error correction code should be generated for a particular type of memory. The error correction code module 106 may be adapted to compute the error correction code when the memory type indicated by signal 119 is matched with the specified memory type in the error correction code module 106, the latter of which may be signaled by the code running on the processor 108.

For mixed access to the memory block 102, data may be access in any order from any of the memory blocks 102a, 102b, 102c, 102d and 102e. However, only when access to certain memory blocks occurs, will the error correction code module 106 update error correction codes. For example, error correction codes may be generated for all access to NAND block 102c. However, accessed to NOR block 102a may not require generation of error correction codes by the error correction code module 106. If the error correction code 106 is instructed to compute error correction code for multiple memory devices during mixed memory page access, the error correction code module 106 may utilize one or more sets of computing units to generate the corresponding error correction codes in parallel. This may occur in, for example, instances where the first access on data bus 110 may be a read of NAND flash 102c data, followed by a write to DRAM block 102d. If the hardware error correction code module 106 is instructed to generate error correction code for both devices, the hardware ECC module 106 may temporarily store two current error correction codes, one for each device. Accordingly, each code may be updated when there is access to its device.

When the external memory interface module 104 accesses the unified memory block 102 by either reading data from or writing data to the memory blocks 102a, 102b, 102c, the external memory interface module 104 may be adapted to utilize signal 113 to inform the error correction code module 106 that the data is presently on the data bus 110. Furthermore, the external memory interface module 104 may utilize signal 114 to indicate the size of the data that is indicated by signal 113. Signal 119 indicates which memory device is being accessed. For example, signal 119 may indicate that NAND flash 102c is being accessed. In an aspect of the invention, signal 119 may be matched with an internal device setting generated by the processor and EDC code 108. Using the data on the data bus 110, the error correction code module 106 computes error correction code for every byte presented on the data bus 110. If there are more bytes on data bus 110 and the error correction code module 106 has enough time to compute the corresponding error correction code for all bytes presently on the data bus before signal 113 again indicates the next accessed data is available on the data bus 110, the error correction code module 106 may utilize one computing unit that computes one byte in one clock cycle. Otherwise, the error correction code module 106 may utilize more computing units to parallel compute error correction code in a given time period.

Once the EMI module 104 has accessed the fixed amount of page data, for example, a 256-byte page, the error correction code module 106 may utilize a counter to indicate when an amount of data equivalent to the page size has been processed. Accordingly, the error correction code module 106 may utilize a signal such as interrupt signal 115 to notify the EDC code running on the processor 108 that the error correction code is ready in the error correction code module 106. In this regard, the EDC does not need to generate the error correction code and this significantly reduces utilization of processor computing cycles. Accordingly, during error code generation, the EDC processes may be suspended, thereby allowing other programs to be executed. If the interrupt signal 115 is asserted, the EDC code may be activated and begins running.

The error detection and correction (EDC) code may then read the error correction code from the error correction code module 106 via bus interface 116 and determine whether to stop the error correction code module 106 from monitoring the external memory interface module 104. Determining whether to end monitoring of the EMI 104 is done since the next data access presented on the data bus 110 may not be related to the page data that was utilized to compute the error correction code. One scenario in which this may occur is when the data is for another memory location.

If the data access to the external memory block 102 is a write operation, then the error correction code that is generated by the error correction code module 106, while writing data to the external memory block 102, may be read by the EDC code and then written to the corresponding external memory page. This stored error correction code that is written to the corresponding external memory page may function as an integrity pattern for that page of data, and may subsequently be utilized to verify the integrity of the associated page of data whenever the page is read.

If the data access to the external memory is a read operation, the EDC code running on processor 108 may compare the newly generated error correction code with an original error correction code stored in the corresponding memory block from which the page of data is read. If the error codes are inconsistent and the error cannot be corrected, the EDC code may generate an error signal or other indication of the error and the data may have to be re-read from external memory 102. If the error is correctable based on the compared result of the two error correction codes, the EDC code may correct the error within the page of data that has already been read into an internal or main memory. An address of the error bit may be determined by comparing the two error correction codes, and the compared result may indicate which bit in a corresponding byte of the read page may be corrupted. Since the page of data has already been read into internal memory or main memory by the EDC code, the EDC code executed by the processor 108 may locate the byte and correct the error bit without reading from the external memory again. Accordingly, the error correction code generation module 106 does not need to store a whole page of data in order to correct a bit in error. Since it is not necessary to store the whole page of data, the die size of the chip can be significantly reduced.

In an illustrative embodiment of the invention, if Hamming code is being utilized and the read data page size is 256 bytes, the error correction code is 22 bits. The 22 bits of error correction codes comprises 16 byte parity bits and 6 column parity bits. The EDC code may be adapted to do an XOR operation between the newly generated error correction code and the error correction code that is stored in the NAND flash block 102*c*. In general, the EDC code is adapted to acquire a 22-bit result in one instruction cycle. If the result of the XOR operation is equal to logic zero (0), this means that there is no error bit in the 256-byte read data page. However, if the result has 11 bits logic of one (1), this means there is a 1-bit error in the read data page, which is correctable. The EDC code may then get the byte address by concatenating bits 21, 19, 17, 15, 13, 11, 9, and 7 of the XORed result and get the bit address in the byte by concatenating bits 5, 3 and 1. If only one bit in the compared result is logic one (1), this means that the stored error correction code is corrupt. In this case, the EDC code may instruct the error correction code module 106 to regenerate the error correction code by reading the same page again. If the logic one (1) bit number is not as stated above, this means that there are more than one bit error in the read data page and the error cannot be corrected by error correction code. In this case, the EDC code may read the page data again or try other methods to recovery the read data, or just simply abandon correction. Exemplary error correction code may comprise Hamming codes, Reed Solomon (RS) codes or other types of error correction codes, some of which may correct more bit errors than others. Utilizing more error correction codes for a fixed amount of page data may result in the correction of more errors.

In instances where the external memory 102 is capable of sequential access, the EDC code may allow the hardware ECC module 106 to monitor signals 113, 114 and 119 after receiving an indication that generation of error correction code for the past page of data is finished. Sequential access means that data may be read or written page by page without any inserted access intervention to handle control and/or status data on data bus 110 or access other memory or other page in the same memory. Accordingly, once the second page of data is presented on the data bus 110, the hardware ECC module 106 may generate a second error correction code for the second page of data without any reset or refresh operation for the hardware error correction code module 106.

It should be recognized that although the invention is described in terms of pages of data, the invention is not limited in this regard. Accordingly, data may be accessed in terms of blocks rather than pages. In this regard, an indication of the size of the blocks of data and the associated source of the blocks of data may be communicated to the error correction code module 106.

Figure 2:
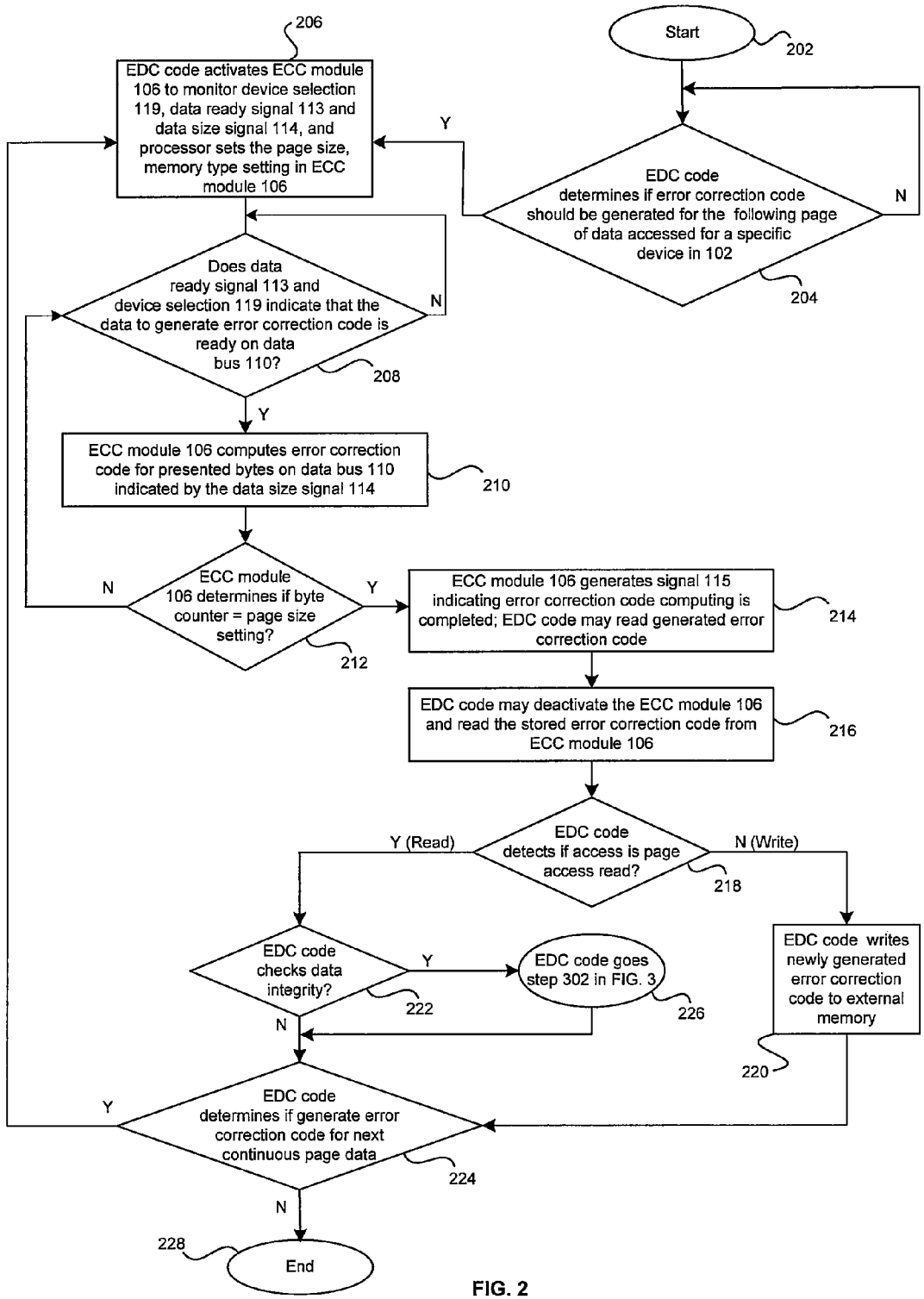
FIG. 2 is a flow chart illustrating exemplary steps that may be utilized to generate error correction codes in an error correction code module based on pages of data, in accordance with an embodiment of the invention.

FIG. 2 is a flow chart illustrating exemplary steps that may be utilized to generate error correction codes in an error correction code module based on pages of data, in accordance with an embodiment of the invention. Referring to FIG. 2, the exemplary steps start with step 202. In step 204, EDC code determines whether error correction code should be generated for the following page of data accessed for a specific device in 102. If it is determined that the error correction code should not be generated for the following page of data, then step 204 is repeated. If error correction code is to be generated, then in step 206, the EDC code may activate the hardware ECC module 106 to monitor device selection signal 119, the data ready signal 113, and the data size signal 114, and the processor/EDC 108 may set the page size and memory type setting in the hardware ECC module 106.

In step 208, it may be determined whether the data ready signal 113 and device selection signal 119 indicate that the data to generate error correction code is ready on the data bus 110. If the data ready signal 113 indicates that data is not ready on the data bus 110, then step 208 is repeated. If the data ready signal 113 indicates that data is ready on the data bus 110, then in step 210, the hardware error correction code module 106 computes error correction code for presented bytes based on data bus 110 as indicated by the data size signal 114. In step 212, the hardware ECC module 106 determines whether a byte counter value is equivalent to a page size setting. If the byte counter value is not equivalent to a page size setting, then control passes back to step 208. However, if the byte counter value is equivalent to a page size setting, then in step 214, the error correction code module 106 may generate a signal, which indicates that computing of the error correction code is complete and the EDC code may read the generated error correction code.

In step 216, the EDC code may deactivate the hardware ECC module 106 and read the stored error correction code from the hardware ECC module 106. In step 218, the EDC code may determine whether the page that is accessed is a read operation. If the page access is a read operation, then in step 222, the EDC code may check data integrity. If the data integrity is to be checked, then the EDC code goes to step 302 of FIG. 3. However, if it is determined that the data integrity is not to be checked, then in step 224, the EDC code determines whether to compute the error correction code for the next continuous page data. If the error correction should be computed for the next continuous page data, then control passes back to step 206. However, if the error correction should not be computed for the next continuous page data, then the exemplary steps end with step 228. Returning to step 218, if the EDC code determines that the page access is not a read operation but is instead a write operation, then in step 220, the EDC code may write the newly generated error correction code to external memory. Step 224 is then executed.

Figure 3:
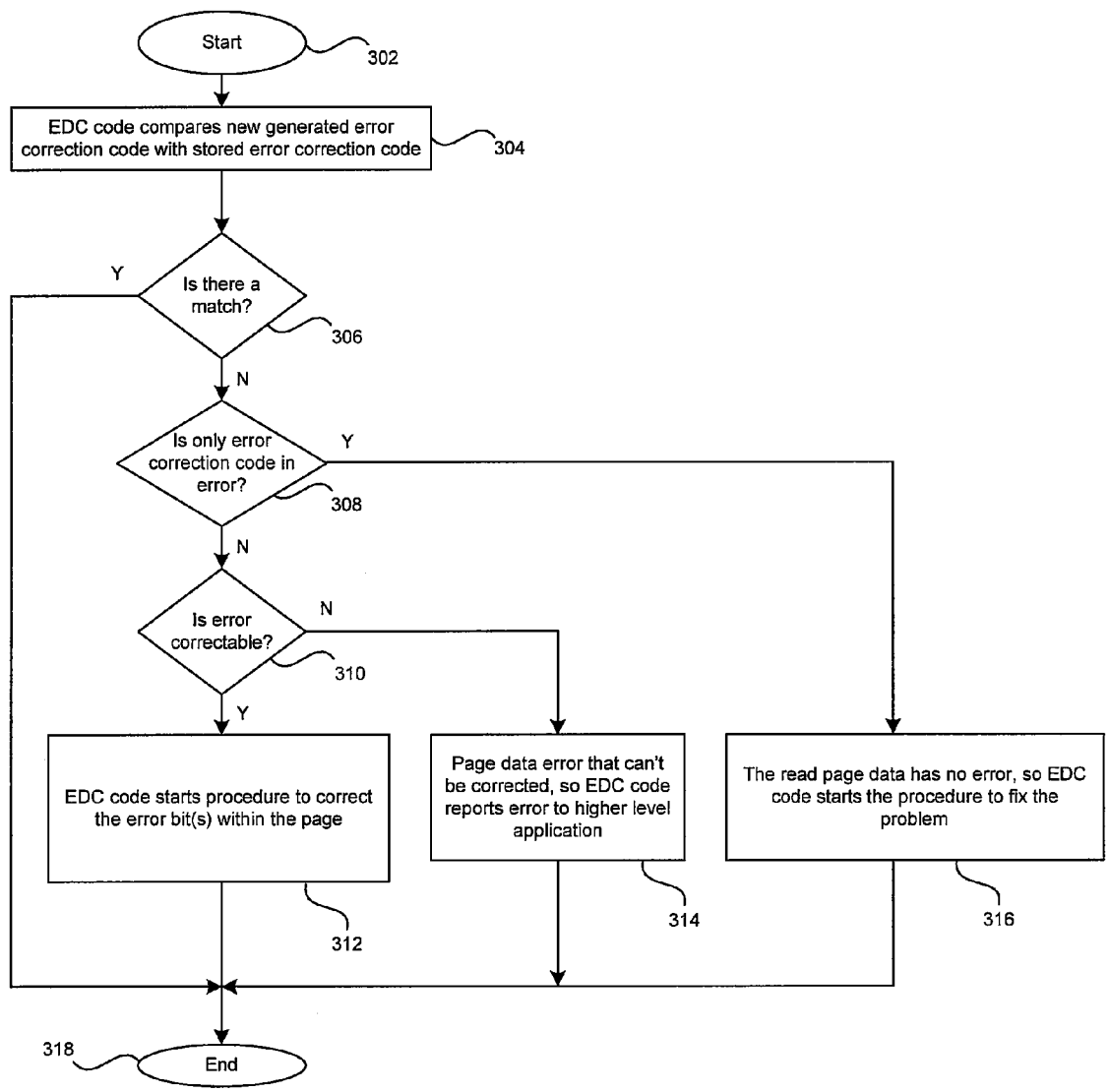
FIG. 3 is a flow chart illustrating exemplary steps that may be utilized to maintain page data integrity by checking for data errors and correcting them, in accordance with an embodiment of the invention.

FIG. 3 is a flow chart illustrating exemplary steps that may be utilized to maintain page data integrity by checking for data errors and correcting them, in accordance with an embodiment of the invention. Referring to FIG. 3, the exemplary steps may start with step 302. Step 302 may be executed in place of step 226 of FIG. 2. Notwithstanding, in step 304, the EDC code compares the newly generated error correction code with a stored error correction code. In step 306, it may be determined whether there is a match between the newly generated error correction code and the stored error correction code. If there is a match, then the exemplary steps may end at step 318. If there is no match between the newly generated error correction code and the stored error correction code, then in step 308, it may be determined whether only the error correction code is in error.

If only the error correction code is in error, then in step 316, read page data has no error and the EDC code may start the procedure to fix the problem. For example, the EDC and the EDC code relocates the page data to another memory location and a new error correction code generated during writing to the new memory location. If only the error correction code is not in error in step 308, then in step 310, it may be determined whether the error is correctable. If the error is correctable, then in step 312, the EDC code may start a procedure to correct the error bit(s) within the page. If the error is not correctable in step 310, then in step 314, the page data error cannot be corrected and the EDC code reports the error to a higher-level application. Subsequent to steps 312, 314, and 316, the exemplary steps may end with step 318.

Figure 4:
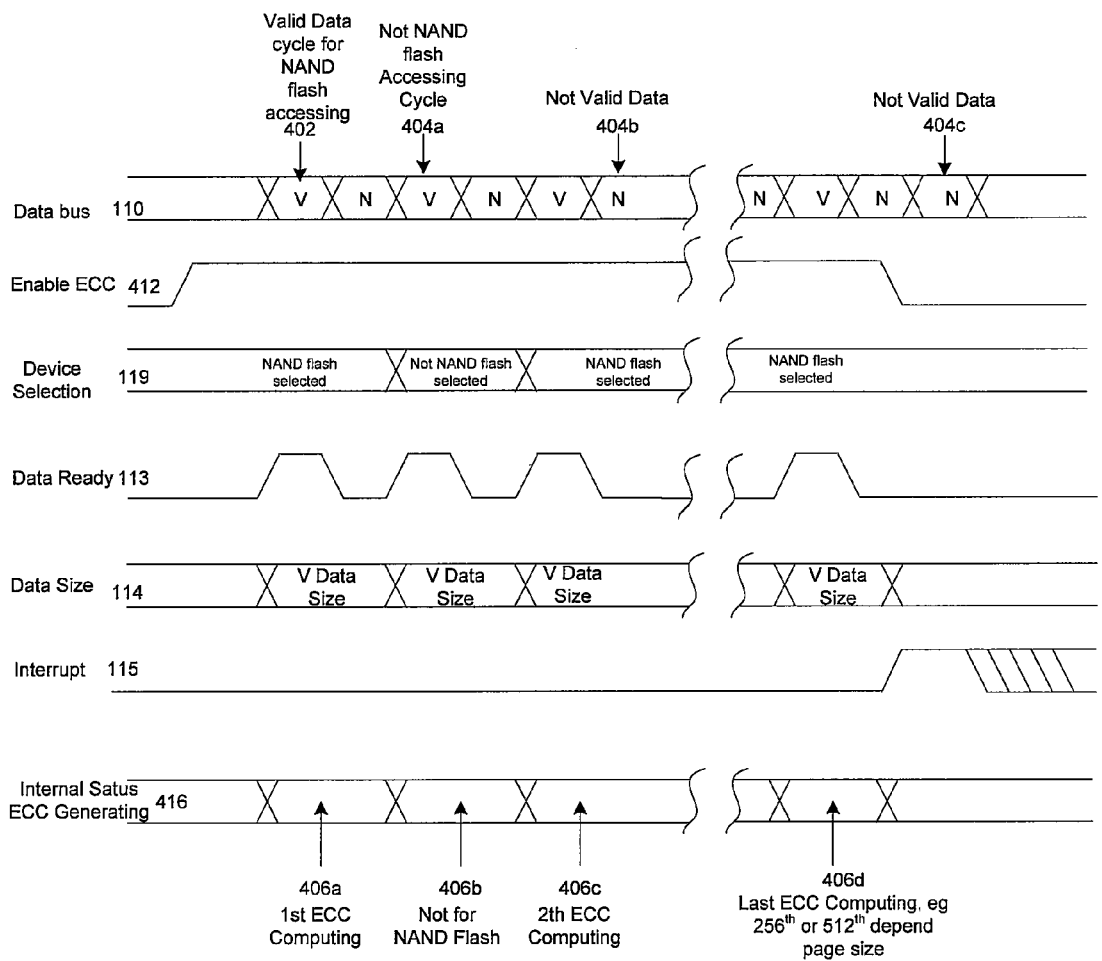
FIG. 4 is an exemplary timing diagram illustrating timing waveforms for error correction code computing for NAND flash, in accordance with an embodiment of the invention.

FIG. 4 is an exemplary timing diagram illustrating timing waveforms for error correction code computing for NAND flash, in accordance with an embodiment of the invention. Referring to FIG. 4, there is shown data bus signal 110, enable error correction code signal 412, device select signal 119, data ready signal 113, data size signal 114, interrupt signal 115 and internal status for ECC generation 416. The internal status for error code (ECC) generation 416 is not a true signal but is utilized to indicate periods of ECC generation. The error correction code enable signal 412 may be an internal or external signal for module 106.

The data bus signal 110 illustrates periods of valid data and periods of invalid data. For example, reference 402 indicates a valid cycle for NAND flash access since device selection signal 119 is asserted during that interval. On the other hand, reference 404a indicates an interval that is not a valid NAND flash access cycle. Data is not valid on the data bus 110 (FIG. 1) during intervals 404b and invalid 404c. When the error detection and correction code asserts the error correction code enable signal 412, this causes the error correction code module 106 of FIG. 1 to initiate monitoring of the device selection signal 119, the data ready signal 113 and the data size signal 114, in order to generate error correction codes based on valid data presently on data bus 110. The device selection signal 119 indicates when the NAND block 102c of FIG. 1 is accessed. In this regard, whenever the device selection signal 119 is asserted, this indicates an access to the NAND block 102c.

In operation, with reference to FIG. 1 and FIG. 4, generation of the error correction code may be initiated when the enable error correction code signal 412 is asserted. While the error correction code signal 412 is asserted and data is ready on the data bus 110 as indicated by assertion of the device selection signal 119, data ready signal 113, the data size signal 114 indicates the size of the data for which error codes should be generated. The error correction code module 106 may compute the error correction code for the NAND block 102c when the device selection signal 119 is asserted during a valid data cycle such as 402. After generation of the error correction code is complete, an indication signal such as interrupt 115 may be sent to the processor to inform the EDC code of the completion. Intervals 406a, 406c describe an internal status of the error correction code module 106 and illustrate intervals during which three consecutive error correction codes are computed. Interval 406d illustrates when the last computation is done in a current phase, and the error correction code is generated for the past page of data.

Since the computing intensive tasks of error correction are handled by the error correction code module 106 and finding the correct byte and correct error bit is handled by the error detection and correction code runs on the processor 108, the invention overcomes the drawbacks inherent in conventional systems that utilize either a dedicated software solution or a dedicated hardware solution. Notwithstanding, it should readily be understood that the invention is not limited to being utilized for NAND flash memory applications, but may be utilized for other flash memories that utilize burst data page operations like NOR flash memory to maintain data integrity with very low system performance cost and hardware cost.

Accordingly, the present invention may be realized combination of hardware and software that the hardware takes computing intensive takes that is generating the error correction code and software that has no limitation to access page data. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for ensuring data integrity in a data processing system, the method comprising:

monitoring when data for a specified device is available for error correction code generation;

receiving a first indication of said specified device, a second indication of said data and a third indication of a size of said data during said monitoring;

generating new error correction code in hardware for said data based on said indicated size of said data;

indicating when said generating of said new error correction code for a specified number of accesses for at least a portion of said data is complete; and correcting detected errors in software based on said generated new error correction code.

2. The method according to claim 1, comprising enabling or disabling said error correction code generation.

3. The method according to claim 2, wherein said enabling and said disabling is accomplished via an enable signal.

4. The method according to claim 1, wherein said first indication comprises a device selection signal.

5. The method according to claim 1, wherein said second indication is a data ready signal.

6. The method according to claim 1, wherein said third indication of said size of said data is a data size signal.

7. The method according to claim 1, comprising counting said specified number of accesses.

8. The method according to claim 1, comprising controlling said specified number of accesses by a page size setting.

9. The method according to claim 1, comprising specifying a page counter that indicates bytes of said data that are processed.

10. The method according to claim 9, comprising generating an interrupt when said page counter indicates that all bytes are processed.

11. The method according to claim 1, comprising generating a signal that indicates when said generation of said new error correction code is complete.

12. The method according to claim 1, comprising determining whether data access for said data is a read access or a write access.

13. The method according to claim 12, comprising:
deactivating error code generation for said data; and
if said data access is a write operation, writing said newly generated error correction code to external memory.

14. The method according to claim 12, comprising:
deactivating error correction code generation for said data; and
if said data access is a read operation, reading newly generated error correction code and reading stored error correction code corresponding to read data.

15. The method according to claim 14, comprising checking integrity of said read data.

16. The method according to claim 15, comprising comparing said newly generated error correction code with a stored error correction code corresponding to said read data.

17. The method according to claim 16, comprising determining whether said newly generated error correction code matches said stored error correction code.

18. The method according to claim 17, comprising determining whether said error correction code is incorrect if said newly generated error correction code does not match said stored error correction code.

19. The method according to claim 18, comprising determining whether an error is correctable if said error correction code is not in error.

20. The method according to claim 19, comprising if said error is correctable, correcting said error.

21. The method according to claim 19, comprising reporting said error if said error is not correctable.

22. A machine-readable storage having stored thereon, a computer program having at least one code section for ensuring data integrity in a data processing system, the at least one code section being executable by a machine for causing the machine to perform steps comprising:

monitoring when data for a specified device is available for error correction code generation;

receiving a first indication of said specified device, a second indication of said data and a third indication of a size of said data during said monitoring;

generating new error correction code in hardware for said data based on said indicated size of said data;

indicating when said generating of said new error correction code for a specified number of accesses for at least a portion of said data is complete; and correcting detected errors in software based on said generated new error correction code.

23. The machine-readable storage according to claim 22, comprising code for enabling or disabling said error correction code generation.

24. The machine-readable storage according to claim 23, wherein said enabling and said disabling is accomplished via an enable signal.

25. The machine-readable storage according to claim 22, wherein said first indication comprises a device selection signal.

26. The machine-readable storage according to claim 22, wherein said second indication is a data ready signal.

27. The machine-readable storage according to claim 22, wherein said third indication of said size of said data is a data size signal.

28. The machine-readable storage according to claim 22, comprising code for counting said specified number of accesses.

29. The machine-readable storage according to claim 22, comprising code for controlling said specified number of accesses by a page size setting.

30. The machine-readable storage according to claim 22, comprising code for specifying a page counter that indicates bytes of said data that are processed.

31. The machine-readable storage according to claim 30, comprising code for generating an interrupt when said page counter indicates that all bytes are processed.

32. The machine-readable storage according to claim 22, comprising code for generating a signal that indicates when said generation of said new error correction code is complete.

33. The machine-readable storage according to claim 22, comprising code for determining whether data access for said data is a read access or a write access.

34. The machine-readable storage according to claim 33, comprising:
code for deactivating error code generation for said data; and
code for writing said newly generated error correction code to external memory, if said data access is a write operation.

35. The machine-readable storage according to claim 33, comprising:
code for deactivating error correction code generation for said data; and
code for reading a newly generated error correction code and for reading stored error correction code corresponding to read data, if said data access is a read operation.

36. The machine-readable storage according to claim 35, comprising code for checking integrity of said read data.

37. The machine-readable storage according to claim 36, comprising code for comparing said newly generated error correction code with a stored error correction code corresponding to said read data.

38. The machine-readable storage according to claim 37, comprising code for determining whether said newly generated error correction code matches said stored error correction code.

39. The machine-readable storage according to claim 38, comprising code for determining whether said error correction code is incorrect if said newly generated error correction code does not match said stored error correction code.

40. The machine-readable storage according to claim 39, comprising code for determining whether an error is correctable if said error correction code is not in error.

41. The machine-readable storage according to claim 40, comprising code for correcting said error, if said error is correctable.

42. The machine-readable storage according to claim 40, comprising code for reporting said error if said error is not correctable.

43. A system for ensuring data integrity in a data processing system, the system comprising:
a hardware error correction code module that monitors when data for a specified device is available for new error correction code generation;
said hardware error correction code module receives a first indication of said specified device, a second indication of said data and a third indication of a size of said data during said monitoring;
said hardware error correction code module generates said new error correction code for said data based on said indicated size of said data;
said hardware error correction code module indicates when said generating of said new error correction code for a specified number of accesses for at least a portion of said data is complete; and
code executed by a processor that corrects detected errors in software based on said generated new error correction code.

44. The system according to claim 43, wherein said hardware error correction code module generates an enable signal that enables or disables said error correction code generation.

45. The system according to claim 44, wherein said enable signal enables said error correction code generation when enabled and disables error correction code generation when said enable signal is deasserted.

46. The system according to claim 43, wherein said first indication comprises a device selection signal.

47. The system according to claim 43, wherein said second indication is a data ready signal.

48. The system according to claim 43, wherein said third indication of said size of said data is a data size signal.

49. The system according to claim 43, comprising a byte counter that counts said specified number of accesses.

50. The system according to claim 43, comprising a page size setting generated by said code executed by said processor that controls said specified number of accesses.

51. The system according to claim 43, comprising a page counter that indicates bytes of said data that are processed.

52. The system according to claim 51, comprising an interrupt that is generated and sent to said processor to inform error detection and correction (EDC) code when said page counter indicates that all bytes are processed.

53. The system according to claim 43, comprising a signal that indicates when said generation of said new error correction code is complete.

54. The system according to claim 43, wherein said processor determines whether data access for said data is a read access or a write access.

55. The system according to claim 54, wherein said processor:
deactivates error code generation for said data; and
writes said newly generated error correction code to external memory, if said data access is a write operation.

56. The system according to claim 54, wherein said processor:
deactivates error correction code generation for said data; and
reads newly generated error correction code and reads stored error correction code corresponding to read data, if said data access is a read operation.

57. The system according to claim 56, wherein said code executed by said processor checks integrity of said read data.

58. The system according to claim 57, wherein said code executed by said processor compares said newly generated error correction code with a stored error correction code corresponding to said read data.

59. The system according to claim 58, wherein said code executed by said processor determines whether said newly generated error correction code matches said stored error correction code.

60. The system according to claim 59, wherein said code executed by said processor determines whether said error correction code is incorrect if said newly generated error correction code does not match said stored error correction code.

61. The system according to claim 60, wherein said code executed by said processor determines whether an error is correctable if said error correction code is not in error.

62. The system according to claim 61, wherein said code executed by said processor corrects said error if said error is correctable.

63. The system according to claim 61, wherein said code executed by said processor reports said error if said error is not correctable.

64. A system for ensuring data integrity in a data processing system, the system comprising:
a hardware on-chip error correction code module that generates error correction codes for data;
a processor that detects bytes in error and bits in error via code executed by said processor; and
said code executed by said processor corrects said detected bytes in error and said bits in error utilizing said code executed by said processor.

65. The system according to claim 64, wherein said hardware on-chip error correction code module generates a signal that indicates completion of said generation of said error correction code.

66. The system according to claim 64, wherein said hardware on-chip error correction code module notifies said processor when said generation of said error correction code is complete.

67. A method for ensuring data integrity in a data processing system, the method comprising:
generating new error correction codes for stored data utilizing a hardware on-chip error correction code module;

detecting bytes in error and bits in error via code executed by a processor based on comparing said new error correction codes to stored error correction code of said stored data;

correcting said detected bytes in error and said bits in error utilizing said code executed by said processor; and generating a signal by said hardware on-chip error correction code module that indicates completion of said generation of said new error correction code.

68. A method for ensuring data integrity in a data processing system, the method comprising:

generating new error correction codes for stored data utilizing a hardware on-chip error correction code module;

detecting bytes in error and bits in error via code executed by a processor based on comparing said new error correction codes to stored error correction code of said stored data;

correcting said detected bytes in error and said bits in error utilizing said code executed by said processor; and notifying said processor when said generation of said new error correction code is complete.

69. A machine-readable storage having stored thereon, a computer program having at least one code section for ensuring data integrity in a data processing system, the at least one code section being executable by a machine for causing the machine to perform steps comprising:

generating new error correction codes for stored data utilizing a hardware on-chip error correction code module;

detecting bytes in error and bits in error via code executed by a processor based on comparing said new error correction codes to stored error correction code of said stored data;

correcting said detected bytes in error and said bits in error utilizing said code executed by said processor; and generating a signal by said hardware on-chip error correction code module that indicates completion of said generation of said new error correction code.

70. A machine-readable storage having stored thereon, a computer program having at least one code section for ensuring data integrity in a data processing system, the at least one code section being executable by a machine for causing the machine to perform steps comprising:

generating new error correction codes for stored data utilizing a hardware on-chip error correction code module;

detecting bytes in error and bits in error via code executed by a processor based on comparing said new error correction codes to stored error correction code of said stored data;

correcting said detected bytes in error and said bits in error utilizing said code executed by said processor; and notifying said processor when said generation of said new error correction code is complete.

71. A method for ensuring data integrity in a data processing system, the method comprising:

generating new error correction codes for stored data utilizing a hardware on-chip error correction code module;

detecting via code executed by a processor, bytes in said stored data that are in error and bits in said stored data that are in error based on comparison between said new error correction codes with stored error correction codes in said stored data; and correcting via said code executed by said processor, said detected bytes in said stored data that are in error and said bits in said stored data that are in error.

72. The method according to claim 71, comprising generating a signal by said hardware on-chip error correction code module that indicates completion of said generation of said new error correction codes.

73. The method according to claim 71, comprising notifying said processor when said generation of said new error correction code is complete.

74. A machine-readable storage having stored thereon, a computer program having at least one code section for ensuring data integrity in a data processing system, the at least one code section being executable by a machine for causing the machine to perform the steps comprising:

generating new error correction codes for stored data utilizing a hardware on-chip error correction code module;

detecting via code executed by a processor, bytes in said stored data that are in error and bits in said stored data that are in error based on comparison between said new error correction codes with stored error correction codes in said stored data; and correcting via said code executed by said processor, said detected bytes in said stored data that are in error and said bits in said stored data that are in error.

75. The machine-readable storage according to claim 74, wherein said at least one code section comprises code for generating a signal by said hardware on-chip error correction code module that indicates completion of said generation of said new error correction codes.

76. The machine-readable storage according to claim 74, wherein said at least one code section comprises code for notifying said processor when said generation of said new error correction code is complete.

77. A system for ensuring data integrity in a data processing system, the system comprising:

one or more circuits in a hardware on-chip error correction code module that generates new error correction codes for stored data;

a processor that executes code to detect bytes in said stored data that are in error and bits in said stored data that are in error based on comparison between said new error correction codes with stored error correction codes in said stored data; and said processor executes said code that corrects said detected bytes in said stored data that are in error and said bits in said stored data that are in error.

78. The system according to claim 77, wherein said one or more circuits in said hardware on-chip error correction code module generates a signal that indicates completion of said generation of said new error correction codes.

79. The system according to claim 77, wherein said processor receives a notification when said generation of said new error correction code is complete.

* * * * *